US012803908B2

(12) United States Patent
Du et al.

(10) Patent No.: US 12,803,908 B2
(45) Date of Patent: Nov. 17, 2026

(54) NETWORK PACKET PROCESSING APPARATUS USING MEMORY WITH LOWER ACCESS LATENCY TO IMPROVE PACKET PRE-PROCESSING PERFORMANCE AND ASSOCIATED NETWORK PACKET PROCESSING METHOD

(71) Applicant: Airoha Technology (Suzhou) Limited, Suzhou City (CN)

(72) Inventors: Peng Du, Nanjing City (CN); Fei Yan, Nanjing City (CN)

(73) Assignee: Airoha Technology (Suzhou) Limited, Suzhou City (CN)

( * ) Notice: Subject to any disclaimer, the term of this patent is extended or adjusted under 35 U.S.C. 154(b) by 60 days.

(21) Appl. No.: 18/964,648

(22) Filed: Dec. 1, 2024

(65) Prior Publication Data

US 2025/0184267 A1 Jun. 5, 2025

(30) Foreign Application Priority Data

Dec. 4, 2023 (CN) ......................... 202311644837.5

(51) Int. Cl.
*H04L 45/74* (2022.01)
*H04L 69/22* (2022.01)

(52) U.S. Cl.
CPC .............. *H04L 45/74* (2013.01); *H04L 69/22* (2013.01)

(58) Field of Classification Search
None
See application file for complete search history.

(56) References Cited

U.S. PATENT DOCUMENTS 10,911,358 B1 2/2021 Nakibly
2005/0105556 A1* 5/2005 Joung ..................... H04L 69/22 370/469
2014/0298303 A1* 10/2014 Kanada ..................... G06F 8/41 717/140
2016/0124772 A1* 5/2016 Mirza ..................... H04L 69/22 718/104
2020/0244780 A1* 7/2020 Peled ...................... H04L 69/12
2022/0058132 A1* 2/2022 Roberts ............... G06F 12/0864

FOREIGN PATENT DOCUMENTS

TW 202215251 A 4/2022

* cited by examiner

*Primary Examiner* — Scott B Christensen
(74) *Attorney, Agent, or Firm* — Winston Hsu

(57) ABSTRACT

A network packet processing apparatus includes a first memory, a second memory, a direct memory access (DMA) controller, and a network processing unit (NPU). Access latency of the second memory is lower than access latency of the first memory. The DMA controller is used to write a network packet into the first memory, and write a partial packet content of the network packet into the second memory. The NPU reads the partial packet content from the second memory, and performs packet pre-processing of the network packet according to the partial packet content.

18 Claims, 6 Drawing Sheets

NETWORK PACKET PROCESSING APPARATUS USING MEMORY WITH LOWER ACCESS LATENCY TO IMPROVE PACKET PRE-PROCESSING PERFORMANCE AND ASSOCIATED NETWORK PACKET PROCESSING METHOD

BACKGROUND OF THE INVENTION

1. Field of the Invention

The present invention relates to network packet processing, and more particularly, to a network packet processing apparatus that uses a memory with a lower access latency to store a partial packet content to improve the packet pre-processing performance of a network processing unit, and an associated network packet processing method.

2. Description of the Prior Art

A network processing unit (NPU) is a processor specially used for network packet processing, and has some features and architecture to accelerate the processing efficiency of network packets. For example, regarding packet forwarding, the NPU can perform packet pre-processing to determine a matched forwarding rule, and then the network chip can refer to the matched forwarding rule to forward a network packet received by a network port through a network port that satisfies the matched forwarding rule. For a conventional embedded device with limited resources, a dynamic random access memory (DRAM) is generally used to store a large number of network packets. Therefore, when the NPU is performing packet pre-processing, it needs to read the packet data from the DRAM. However, the DRAM has a very high access latency. For example, each read operation of the DRAM requires at least 150 nanoseconds. Since the packet pre-processing performance of the NPU is limited by DRAM's high access latency, the overall packet forwarding processing efficiency is degraded due to NPU's limited packet pre-processing performance.

SUMMARY OF THE INVENTION

One of the objectives of the claimed invention is to provide a network packet processing apparatus that uses a memory with a lower access latency to store a partial packet content to improve the packet pre-processing performance of a network processing unit, and an associated network packet processing method.

According to a first aspect of the present invention, an exemplary network packet processing apparatus is disclosed. The exemplary network packet processing apparatus includes a first memory, a second memory, a direct memory access (DMA) controller, and a network processing unit (NPU). An access latency of the second memory is lower than an access latency of the first memory. The DMA controller is arranged to write a network packet into the first memory, and write a partial packet content of the network packet into the second memory. The NPU is arranged to read the partial packet content from the second memory, and perform packet pre-processing of the network packet according to the partial packet content.

According to a second aspect of the present invention, an exemplary network packet processing method is disclosed. The exemplary network packet processing method includes: writing a network packet into a first memory through direct memory access; writing a partial packet content of the network packet into a second memory through direct memory access, wherein an access latency of the second memory is lower than an access latency of the first memory; and reading the partial packet content from the second memory, and performing packet pre-processing of the network packet according to the partial packet content.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
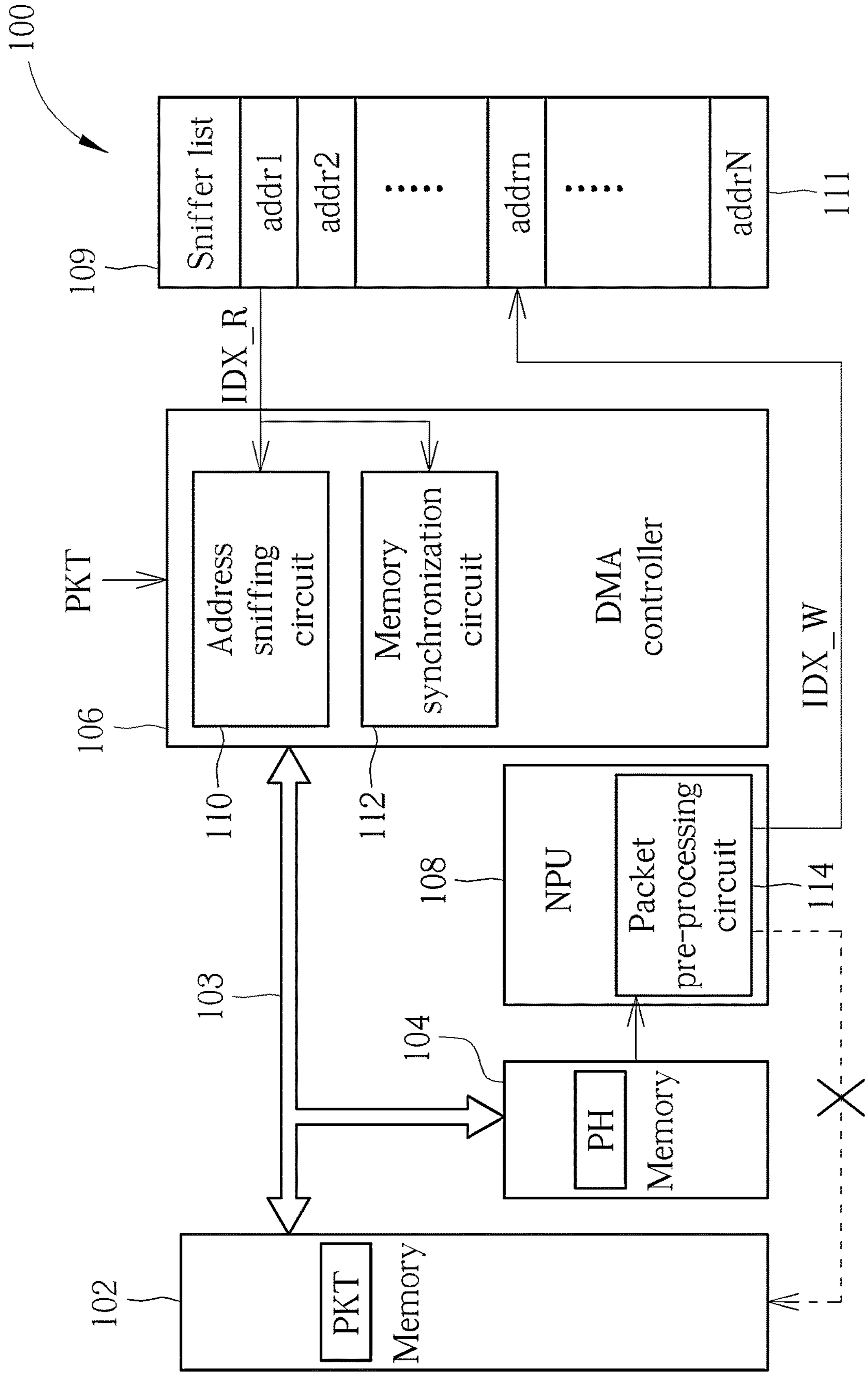
FIG. 1 is a diagram illustrating a network packet processing apparatus according to an embodiment of the present invention.

FIG. 1 is a diagram illustrating a network packet processing apparatus according to an embodiment of the present invention. For example, the network packet processing apparatus 100 may be employed by a network device such as a gateway. As shown in FIG. 1, the network packet processing apparatus 100 may include memories 102 and 104, a direct memory access (DMA) controller 106, and a network processing unit (NPU) 108. The memory 102 and the memory 104 adopt different architectures and have different access latencies. In this embodiment, the access latency of the memory 104 is lower than the access latency of the memory 102. For example, the memory 102 may be a dynamic random access memory (DRAM) and the memory 104 may be a static random access memory (SRAM), and the present invention is not limited thereto.

The NPU 108 may be a RISC-V processor, and may have a packet pre-processing circuit 114 to support the packet pre-processing function. For example, the packet pre-processing function can be used under a packet forwarding scenario, and the present invention is not limited thereto. The DMA controller 106 may directly access (read and write) the memories 102 and 104 via the bus 103 without intervention of the processor. In this embodiment, since the memory 104 has a higher hardware cost compared to the memory 102, the capacity of the memory 102 is larger than the capacity of the memory 104. Thus, the DMA controller 106 stores a network packet PKT (e.g., a TCP packet) into the memory 102 completely. In addition, since the memory 104 has a lower access latency (i.e., a higher access speed) compared to the memory 102, the DMA controller 106 further stores a partial packet content PH of the network packet PKT into the memory 104. When the packet pre-processing function is used under the packet forwarding scenario, the partial packet content PH may include a header of the network packet PKT. The length of the partial packet content PH can be set according to actual application requirements. For example, the partial packet content PH may be 32-byte data in the network packet PKT.

The NPU 108 (particularly, packet pre-processing circuit 114 of NPU 108) may read the partial packet content PH from the memory 104, and perform packet pre-processing (e.g., pre-processing for packet forwarding) of the network packet PKT according to the partial packet content PH. Compared with reading data required by the packet pre-processing circuit 114 from the memory 102 with higher access latency, the present invention reads data required by the packet pre-processing circuit 114 from the memory 104 with lower access latency. This can greatly improve the packet pre-processing performance of the packet pre-processing circuit 114, thereby improving the packet forwarding performance of the subsequent network chip. The principle of the network packet processing apparatus 100 of the present invention will be described in detail below.

In this embodiment, the DMA controller 106 includes an address sniffing circuit 110 and a memory synchronization circuit 112. The address sniffing circuit 110 allocates a memory address to be monitored. For example, a sniffer list 109 can record at most N memory addresses addr1, addr2, . . . , addrn, . . . , addrN. The address sniffing circuit 110 can read the memory address to be monitored (e.g., addr1) from the sniffer list 109 through an index value IDX_R. In addition, during a process in which the DMA controller 106 performs a DMA operation upon the memory 102, the address sniffing circuit 110 further monitors at least one write address at which the DMA controller 106 performs writing upon the memory 102, and triggers the memory synchronization circuit 112 to write the partial packet content PH into the memory 104 when the memory address to be monitored hits (i.e., matches) the at least one write address. In this embodiment, before the network packet PKT is transmitted to the memory 102, the memory synchronization circuit 112 transmits the partial packet content PH to the memory 104, which ensures that the memory 104 has the partial packet content PH of the network packet PKT after the network packet PKT is written into the memory 102. In other words, the same partial packet content PH is stored in both of the memories 102 and 104 synchronously.

In addition to supporting the packet pre-processing function, the NPU 108 is further arranged to create and maintain the aforementioned sniffer list 109. For example, the sniffer list 109 may be stored in the memory 102. The sniffer list 109 may have a fixed length and may be programmed to have a plurality of entries 111 for recording a plurality of memory addresses addr1-addrN of the memory 102 that are available for a plurality of network packets, respectively. The NPU 108 first uses a default value (e.g., 0x0) to initialize all entries 111 in the sniffer list 109 (e.g., addr1=0x0, addr2=0x0, . . . , addrN=0x0), and sets the index value IDX_W by an initial value (e.g., IDX_W=1). Afterwards, the NPU 108 (particularly, packet pre-processing circuit 114 of NPU 108) refers to the index value IDX W to write a memory address of the memory 102 that is available for a network packet into the sniffer list 109, and updates the index value IDX_W (e.g., IDX_W=IDX_W+1) accordingly. In other words, the index value IDX_W is used to indicate which entry 111 in the sniffer list 109 now can be filled with a new memory address to be monitored.

In addition, the index value IDX_R is used to indicate which entry 111 in the sniffer list 109 now can be read by the address sniffing circuit 110 to allocate the memory address to be monitored by the address sniffing circuit 110. When at least one write address at which the DMA controller 106 performs writing upon the memory 102 hits the current memory address to be monitored that is allocated at the address sniffing circuit 110 (for example, the memory address to be monitored falls within a memory address range to be written by a DMA burst), the address sniffing circuit 110 updates the index value IDX_R (e.g., IDX_R=IDX_R+1) for reading a next memory address to be monitored from the sniffer list 109 to take the place of the current memory address to be monitored.

Figure 2:
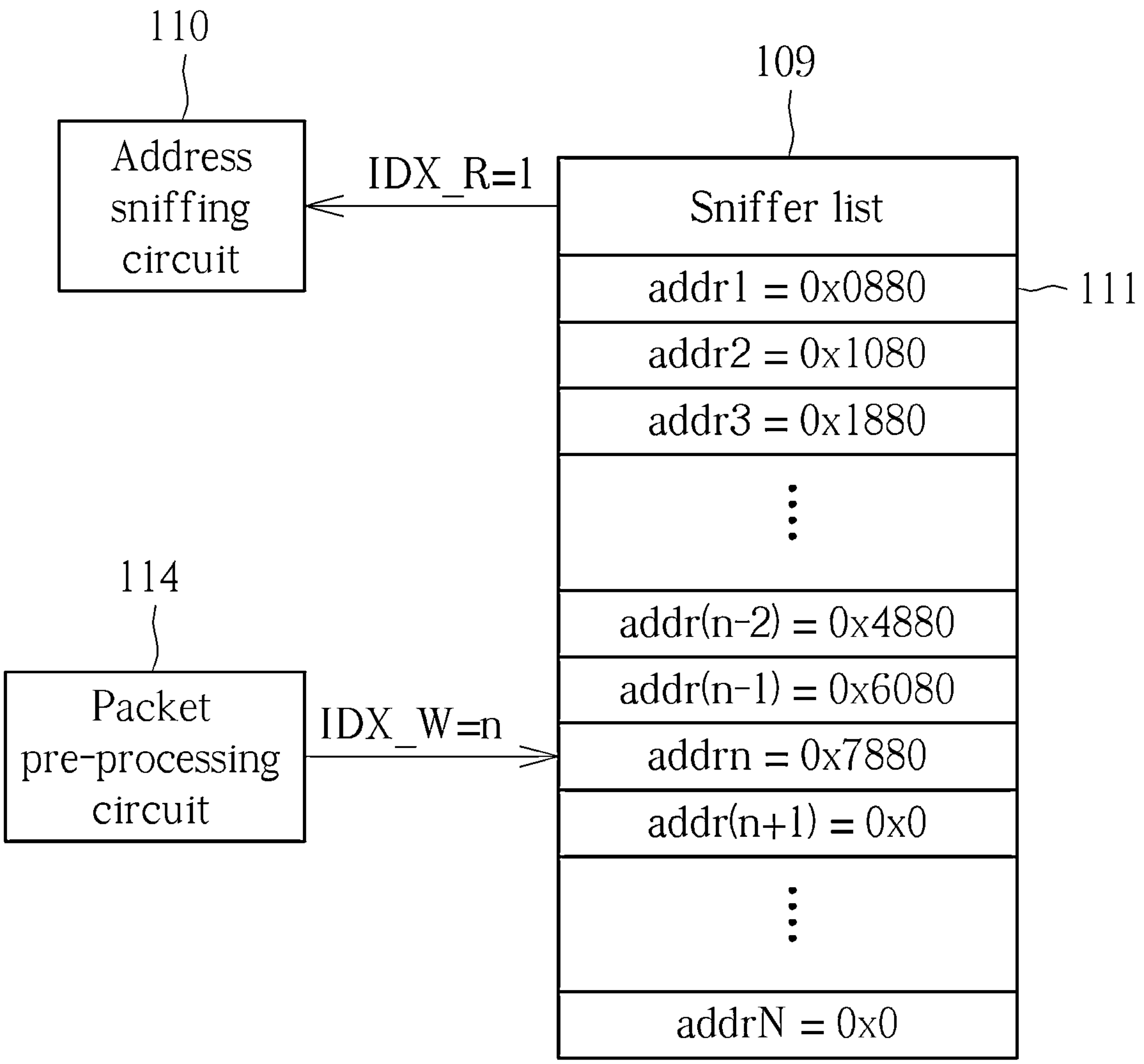
FIG. 2 is a diagram illustrating an address sniffing arrangement according to an embodiment of the present invention.

FIG. 2 is a diagram illustrating an address sniffing arrangement according to an embodiment of the present invention. Since the DMA controller 106 generally uses a DMA burst mode to access the memory 102, the memory address to be monitored that is allocated at the address sniffing circuit 111 needs to be aligned with the DMA burst size. For example, an offset between two memory addresses to be monitored is an integer multiple of the DMA burst size. For example, assuming that a DMA burst size is 128 bytes, the memory address to be monitored may be set by 0x80, 0x100, 0x180, etc., that are aligned with the DMA burst size with a length of 128 bytes, respectively. As shown in FIG. 2, the packet pre-processing circuit 114 writes a plurality of memory addresses of the memory 102 that are available for a plurality of network packets into the entries 111 of the sniffer list 109 one by one. When the current index value IDX_W is equal to n (i.e., IDX_W=n), the address sniffing circuit 110 has recorded addr1=0x0880, addr2=0x1080, addr3=0x1880, . . . addr(n−2)=0x4880, and addr(n−1)=0x6080. At this moment, the packet pre-processing circuit 114 writes a new memory address 0x7880 into an entry indicated by the index value IDX_W=n (i.e., addrn=0x7880), and the index value IDX_W is updated to n+1. If the next new memory address is 0x8080, 0x8080 will be written into an entry indicated by the current index value IDX_W=n+1 (i.e., addr(n+1)=0x8080).

When the current index value IDX_R is equal to 1 (i.e., IDX_R=1), the address sniffing circuit 110 reads an entry indicated by the index value IDX_R=1 and obtains a memory address (i.e., addr1=0x0880) in the sniffer list 109 that is set by the packet pre-processing circuit 114 to act as a current memory address to be monitored, and updates the index value IDX_R to 2. When a new memory address to be monitored needs to be set subsequently, the address sniffing circuit 110 reads an entry indicated by the index value IDX_R=2 to obtain a memory address (i.e., addr1=0x1080) in the sniffer list 109 that is set by the packet pre-processing circuit 114 to act as the memory address to be monitored.

Figure 3:
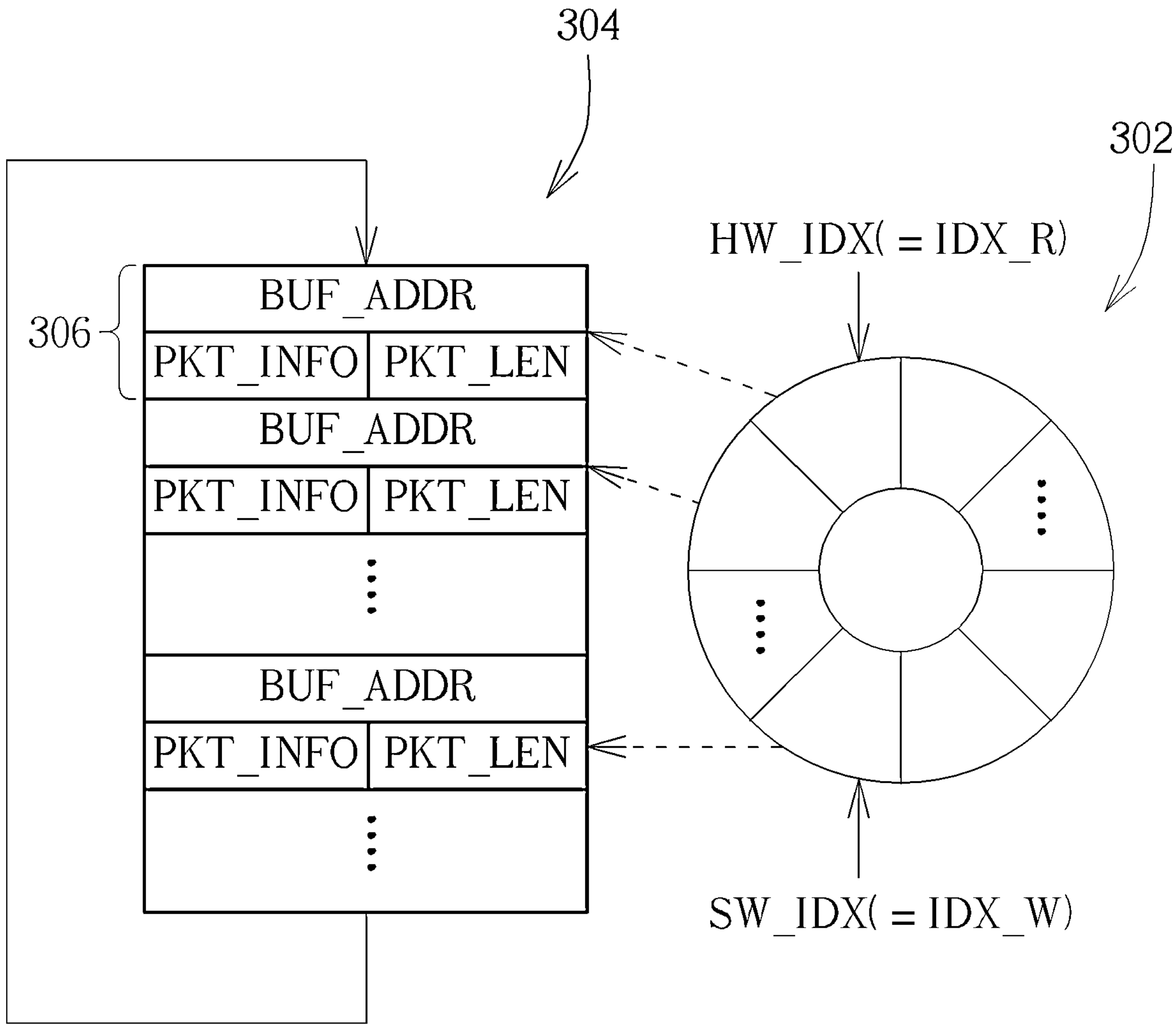
FIG. 3 is a diagram illustrating maintenance of the sniffer list shown in FIG. 1 that is performed through a data structure of a ring buffer according to an embodiment of the present invention.

In some embodiments of the present invention, the NPU 108 (particularly, packet pre-processing circuit 114 of NPU 108) writes memory addresses into the sniffer list 109 through a data structure of a ring buffer, and the address sniffing circuit 110 reads memory addresses from the sniffer list 109 through the data structure of the ring buffer. FIG. 3 is a diagram illustrating maintenance of the sniffer list 109 shown in FIG. 1 that is performed through a data structure of a ring buffer according to an embodiment of the present invention. During the process of receiving network packets, in addition to storing the network packets, the memory 102 further allocates a storage space as a ring buffer 302 to record the description information of the network packets. That is, the data structure 304 of the ring buffer 302 is used to record a plurality of packet descriptors 306 that correspond to a plurality of network packets, respectively. Each of the packet descriptors 306 is used to describe a memory address BUF_ADDR of the memory 102 (i.e., a write address of the memory 102) that is allocated to a corresponding network packet for direct memory access, the packet-related information PKT_INFO and the packet length PKT_LEN, where the write address BUF_ADDR is the start address (which is also the start bit of the header), and can be used as the memory address to be monitored by the address sniffing circuit 110. Therefore, the aforementioned sniffer list 109 may be realized by using write addresses BUF_ADDR of a plurality of network packets that are recorded in the data structure 304 of the ring buffer 302. The ring buffer 302 is maintained through two index values HW_IDX and SW_IDX. The index value HW_IDX is controlled by hardware and is used to indicate the buffer position in the ring buffer 302 that corresponds to a currently received network packet, and can be used as the aforementioned index value IDX_R. In addition, the index value SW_IDX is written by software to indicate the buffer position in the ring buffer 302 that the NPU 108 (particularly, packet pre-processing circuit 114 of NPU 108) writes a memory address currently, and can be used as the aforementioned index value IDX_W.

Figure 4:
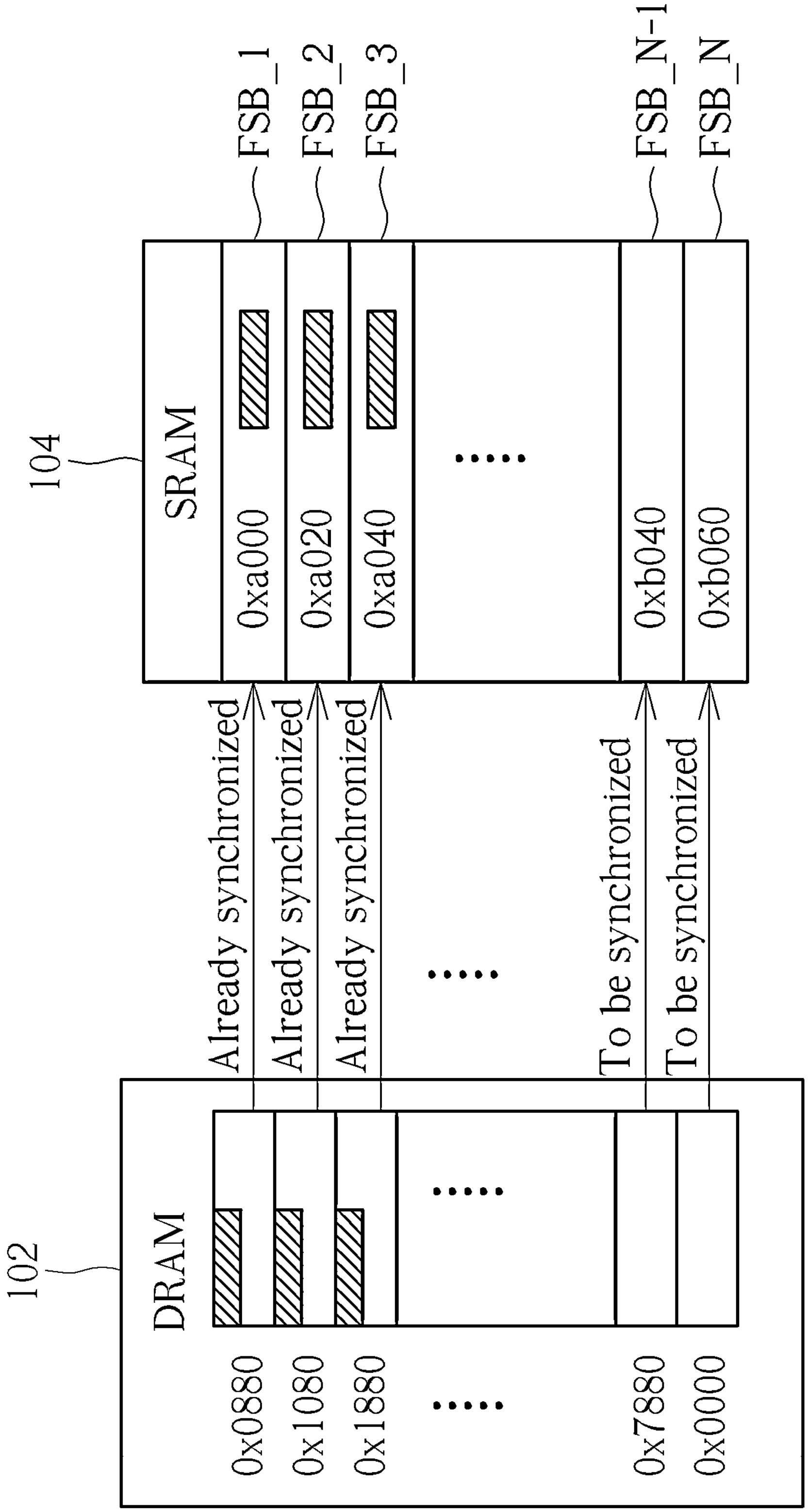
FIG. 4 is a diagram illustrating memory synchronization according to an embodiment of the present invention.

When the address sniffing circuit 110 detects a hit of a monitored memory address through memory address comparison, the address sniffing circuit 110 triggers the memory synchronization circuit 112 to write the packet content (e.g., header) required by packet pre-processing into the memory 104. FIG. 4 is a diagram illustrating memory synchronization according to an embodiment of the present invention. The memory synchronization circuit 112 only transmits the concerned partial packet content (e.g., header) to the memory 104 directly. In one embodiment, the storage space of the memory 104 can be pre-divided into a plurality of storage blocks FSB_1, FSB_2, FSB_3, . . . , FSB_N−1, FSB_N for storing a plurality of partial packet contents that correspond to a plurality of network packets, respectively. Each of the storage blocks FSB_1-FSB_N may have a fixed length. In addition, the total number of storage blocks FSB_1-FSB_N may be equal to the total number of entries in the sniffer list 109. That is, there is one-to-one mapping between storage blocks in the memory 104 and entries in the sniffer list 109. In this way, it is ensured that there is one-to-one mapping between memory addresses to be monitored by address sniffing and partial packet contents (e.g., headers) stored in the memory 104. As shown in FIG. 4, when a packet is written into the memory (labeled by "DRAM") 102 via direct memory access, the memory synchronization circuit 112 ensures that a partial packet content (e.g., a header) included in the packet is synchronously stored in a storage block in the memory (labeled by "SRAM") 104.

Figure 5:
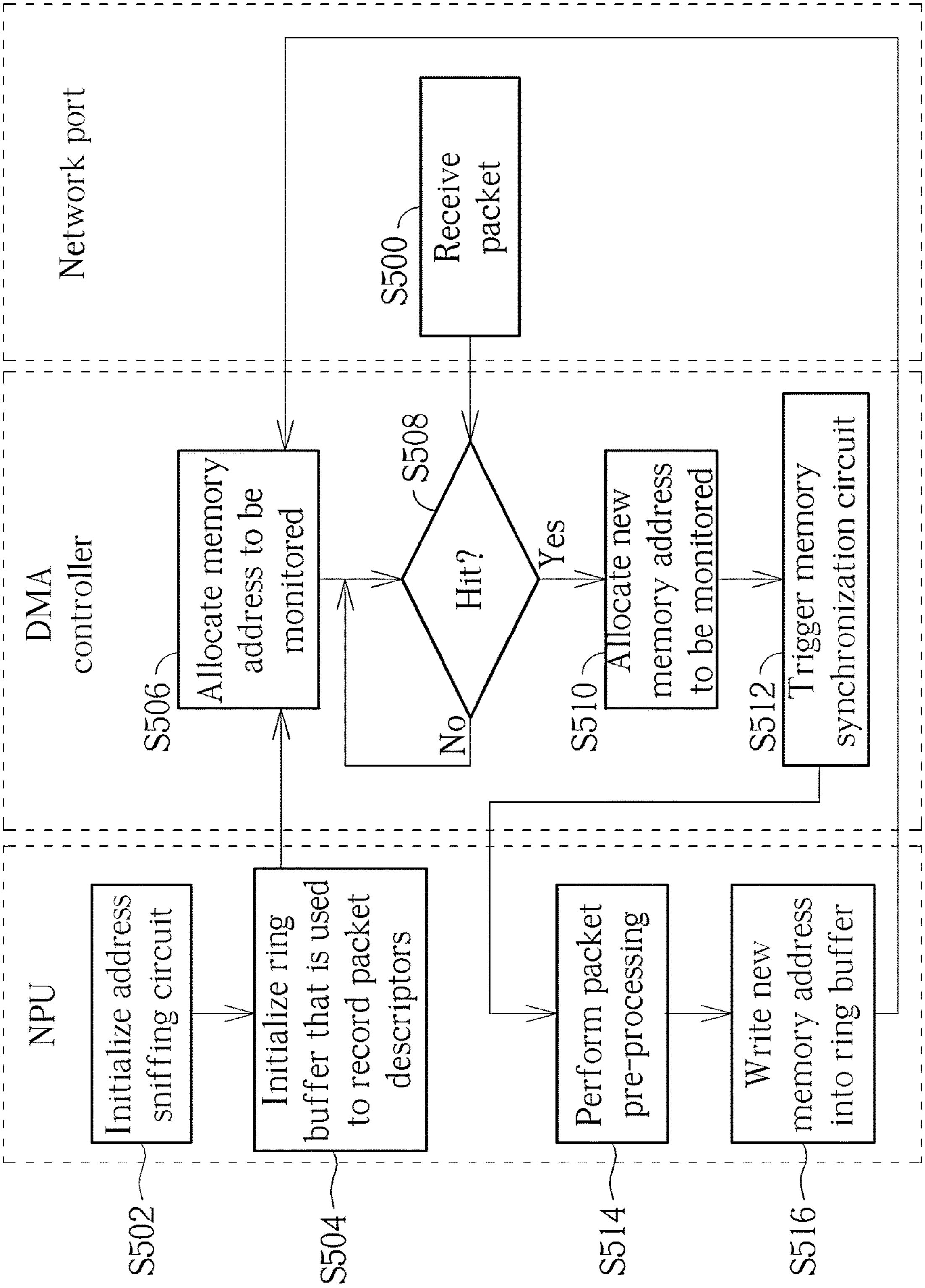
FIG. 5 is a flowchart illustrating a network packet processing method according to an embodiment of the present invention.

FIG. 5 is a flowchart illustrating a network packet processing method according to an embodiment of the present invention. Provided that the result is substantially the same, the steps are not required to be executed in the exact order shown in FIG. 5. At step S502, the NPU 108 initializes the address sniffing circuit 110. At step S504, the NPU 108 initializes the ring buffer 302 that is used for storing packet descriptors. Since the sniffer list 109 can be maintained through the packet descriptors recorded in the ring buffer 302, the initialization of the ring buffer 302 is also the initialization of the sniffer list 109. At step S506, the DMA controller 106 (particularly, address sniffing circuit 110 of DMA controller 106) obtains a memory address to be monitored from the ring buffer 302 (particularly, sniffer list 109 maintained by ring buffer 302). When a network port receives a packet (step S500), the DMA controller 106 performs direct memory access upon the memory 102 to write the packet into the memory 102. At this moment, the address sniffing circuit 110 detects whether at least one write address at which the DMA controller 106 performs writing upon the memory 102 hits the current memory address to be monitored (step S508).

When the comparison of memory addresses indicates a hit of the monitored memory address, the address sniffing circuit 110 triggers the memory synchronization circuit 112 to write a partial packet content (e.g., a header) into the memory 104. At step S514, the NPU 108 (particularly, packet pre-processing circuit 114 of NPU 108) reads the partial packet content (e.g., header) from the memory 104 for packet pre-processing. At step S516, when forwarding of the packet in the memory 102 is completed, the storage space originally occupied by the packet can be released for use by a new packet received by a network port. Therefore, the NPU 108 (particularly, packet pre-processing circuit 114 of NPU 108) can store a new memory address into the ring buffer 302. That is, the new memory address is written into the sniffer list 109 maintained by the ring buffer 302 to act as a future memory address to be monitored.

Figure 6:
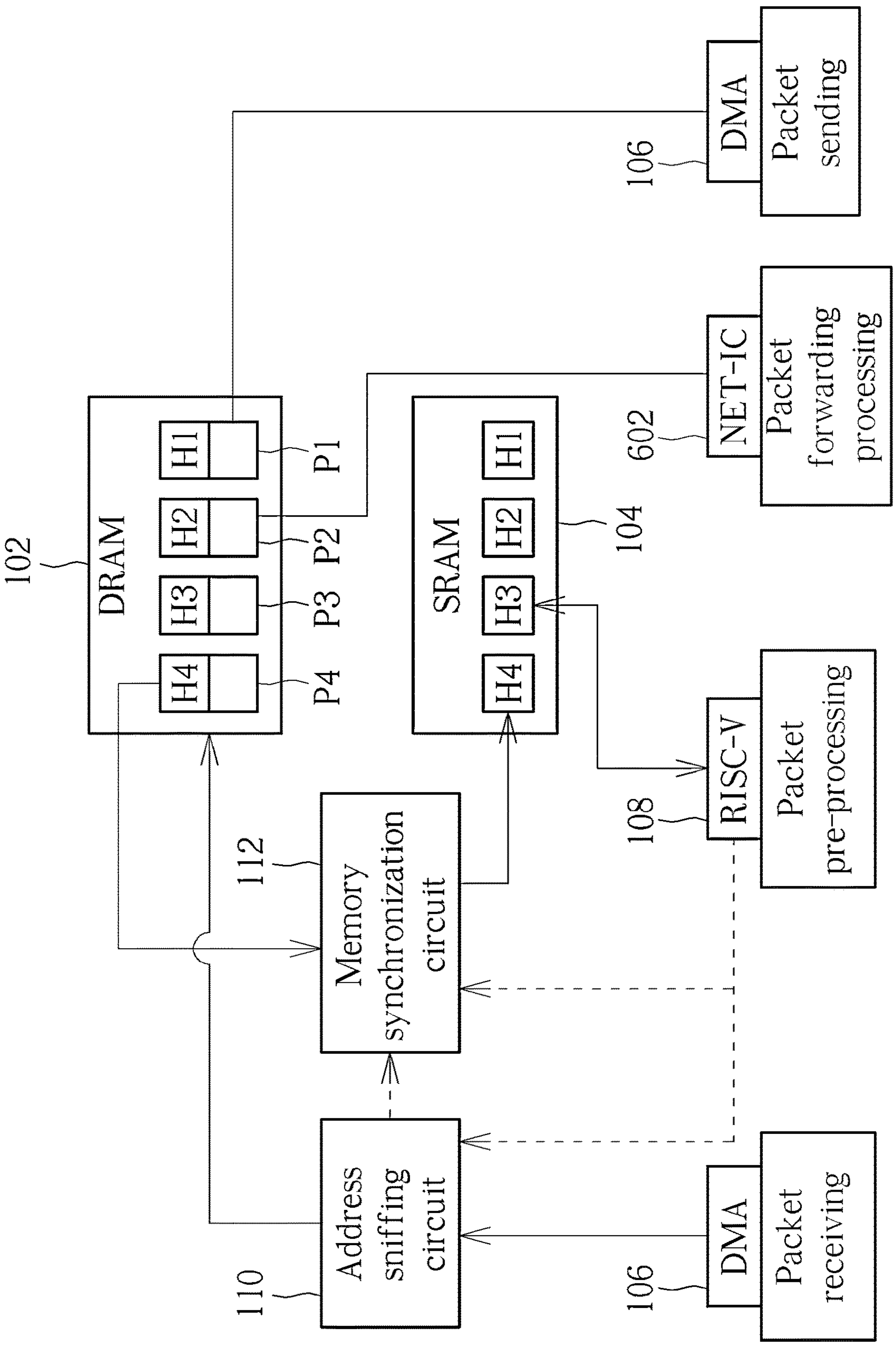
FIG. 6 is a diagram illustrating a design of using the network packet processing apparatus shown in FIG. 1 to perform packet pre-processing for packet forwarding performance improvement according to an embodiment of the present invention.

FIG. 6 is a diagram illustrating a design of using the network packet processing apparatus 100 shown in FIG. 1 to perform packet pre-processing for packet forwarding performance improvement according to an embodiment of the present invention. Compared to reading the data required by the packet pre-processing circuit 114 from the memory (labeled by "DRAM") 102 with higher access latency, the present invention reads the data required by the packet pre-processing circuit 114 from the memory (labeled by "SRAM") 104 with lower access latency. This can greatly improve the packet pre-processing performance of the packet pre-processing circuit 114, thereby improving the packet forwarding performance of the subsequent network chip (labeled by "NET-IC") 602. As shown in FIG. 6, when the network device (e.g., gateway) receives the network packets P1, P2, P3, and P4 in sequence, the DMA controller (labeled by "DMA") 106 writes the network packets P1, P2, P3, and P4 into the memory 102 in sequence. In addition, with the assistance of the address sniffing circuit 110 and the memory synchronization circuit 112, respective partial packet contents (e.g., headers) of the network packets P1, P2, P3, and P4 are also written into the memory 104 in sequence. The NPU (labeled by "RISC-V") 108 can quickly read partial packet contents (e.g., headers) H1, H2, H3, and H4 from the memory 104 to perform packet pre-processing corresponding to the network packets P1, P2, P3, and P4.

For example, the packet pre-processing can determine forwarding rules of network packets P1, P2, P3, and P4, respectively. According to the forwarding rules obtained by the packet pre-processing, the network chip (labeled by "NET-IC") 602 performs packet forwarding processing, and reads the network packets P1, P2, P3, and P4 from the memory 102 through the DMA controller 106 and sends the network packets P1, P2, P3, and P4 through designated network ports.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network packet processing apparatus comprising:

a first memory;

a second memory, wherein an access latency of the second memory is lower than an access latency of the first memory;

a direct memory access (DMA) controller, arranged to write a network packet into the first memory, and write a partial packet content of the network packet into the second memory; and a network processing unit (NPU), arranged to read the partial packet content from the second memory, and perform packet pre-processing of the network packet according to the partial packet content;

wherein the DMA controller comprises:

a memory synchronization circuit; and an address sniffing circuit, arranged to allocate an address memory to be monitored, monitor at least one write address at which the DMA controller performs writing upon the first memory, and trigger the memory synchronization circuit to write the partial packet content into the second memory when the address memory to be monitored hits the at least one write address, wherein writing the partial packet content into the second memory depends on whether the address memory to be monitored hits the at least one write address.

2. The network packet processing apparatus of claim 1, wherein the partial packet content comprises a header of the network packet.

3. The network packet processing apparatus of claim 1, wherein the first memory is a dynamic random access memory, and the second memory is a static random access memory.

4. The network packet processing apparatus of claim 1, wherein before the network packet is transmitted to the first memory, the memory synchronization circuit transmits the partial packet content to the second memory.

5. The network packet processing apparatus of claim 1, wherein when the address memory to be monitored hits the at least one write address, the address sniffing circuit is further arranged to allocate another address memory to be monitored to take the place of the address memory to be monitored.

6. The network packet processing apparatus of claim 1, wherein the NPU is further arranged to create and maintain a sniffer list; the sniffer list comprises a plurality of entries for recording a plurality of memory addresses of the first memory that are available for a plurality of network packets, respectively; and the address sniffing circuit is further arranged to obtain the address memory to be monitored from the sniffer list.

7. The network packet processing apparatus of claim 6, wherein the NPU writes memory addresses into the sniffer list through a data structure of a ring buffer, and the address sniffing circuit reads memory addresses from the sniffer list through the data structure of the ring buffer.

8. The network packet processing apparatus of claim 7, wherein the data structure of the ring buffer is arranged to record a plurality of packet descriptors that correspond to the plurality of network packets, respectively; and the sniffer list is maintained through the plurality of packet descriptors.

9. The network packet processing apparatus of claim 6, wherein the second memory comprises a storage space; the storage space is divided into a plurality of storage blocks used for storing a plurality of partial packet contents that correspond to the plurality of network packets, respectively; and a number of the plurality of entries included in the sniffer list is equal to a number of the plurality of storage blocks included in the storage space.

10. A network packet processing method comprising:

writing a network packet into a first memory through direct memory access;

writing a partial packet content of the network packet into a second memory through direct memory access, wherein an access latency of the second memory is lower than an access latency of the first memory; and reading the partial packet content from the second memory, and performing packet pre-processing of the network packet according to the partial packet content;

wherein writing the partial packet content of the network packet into the second memory through the direct memory access comprises:

allocating an address memory to be monitored;

monitoring at least one write address at which the direct memory access performs writing upon the first memory; and in response to the address memory to be monitored hitting the at least one write address, writing the partial packet content into the second memory;

wherein writing the partial packet content into the second memory depends on whether the address memory to be monitored hits the at least one write address.

11. The network packet processing method of claim 10, wherein the partial packet content comprises a header of the network packet.

12. The network packet processing method of claim 10, wherein the first memory is a dynamic random access memory, and the second memory is a static random access memory.

13. The network packet processing method of claim 10, wherein before the network packet is transmitted to the first memory, the partial packet content is transmitted to the second memory.

14. The network packet processing method of claim 10, wherein writing the partial packet content of the network packet into the second memory through the direct memory access comprises:

in response to the address memory to be monitored hitting the at least one write address, allocating another address memory to be monitored to take the place of the address memory to be monitored.

15. The network packet processing method of claim 10, further comprising:

creating and maintaining a sniffer list;

wherein the sniffer list comprises a plurality of entries for recording a plurality of memory addresses of the first memory that are available for a plurality of network packets, respectively; and the address memory to be monitored is obtained from the sniffer list.

16. The network packet processing method of claim 15, further comprising:

writing memory addresses into the sniffer list and reading memory addresses from the sniffer list through a data structure of a ring buffer.

17. The network packet processing apparatus of claim 16, wherein the data structure of the ring buffer is arranged to record a plurality of packet descriptors that correspond to the plurality of network packets, respectively; and the sniffer list is maintained through the plurality of packet descriptors.

18. The network packet processing method of claim 15, wherein the second memory comprises a storage space; the storage space is divided into a plurality of storage blocks for storing a plurality of partial packet contents that correspond to the plurality of network packets, respectively; and a number of the plurality of entries included in the sniffer list is equal to a number of the plurality of storage blocks included in the storage space.

* * * * *